US012576369B2

(12) United States Patent
Hildreth et al.

(10) Patent No.: US 12,576,369 B2
(45) Date of Patent: Mar. 17, 2026

(54) HIGH EFFICIENCY BRINE MAKER

(71) Applicant: Brine Masters, LLC, Carmel, IN (US)

(72) Inventors: Clay Hildreth, Carmel, IN (US); Andrew John Humke, Dubuque, IA (US)

(73) Assignee: Brine Masters, LLC, Westfield, IN (US)

(*) Notice: Subject to any disclaimer, the term of this patent is extended or adjusted under 35 U.S.C. 154(b) by 941 days.

(21) Appl. No.: 17/743,733

(22) Filed: May 13, 2022

(65) Prior Publication Data

US 2022/0362723 A1 Nov. 17, 2022

Related U.S. Application Data

(60) Provisional application No. 63/188,628, filed on May 14, 2021.

(51) Int. Cl.

*B01F 21/20* (2022.01)
*B01F 21/00* (2022.01)
*B01F 35/71* (2022.01)

(52) U.S. Cl.

CPC ............ *B01F 21/221* (2022.01); *B01F 21/30* (2022.01); *B01F 35/71731* (2022.01); *B01F 2215/0427* (2013.01)

(58) Field of Classification Search

CPC ..................................................... B01F 21/221
See application file for complete search history.

(56) References Cited

U.S. PATENT DOCUMENTS

| | | | | |
|---|---|---|---|---|
| 7,366,621 | B2 | 4/2008 | Sprague | |
| 7,810,987 | B2 | 10/2010 | Hildreth | |
| 8,251,569 | B2 | 8/2012 | Hildreth | |
| 8,382,364 | B2 | 2/2013 | Hildreth | |
| 8,870,444 | B2 | 10/2014 | Hildreth | |
| 9,156,013 | B2 | 10/2015 | Hildreth et al. | |
| 10,376,854 | B2 | 8/2019 | Hildreth et al. | |
| 10,471,399 | B1 * | 11/2019 | Hellbusch ......... | B01F 35/71731 |
| 10,544,340 | B2 | 1/2020 | Nesheim et al. | |
| 10,766,010 | B2 | 9/2020 | Nesheim et al. | |
| 10,960,363 | B2 | 3/2021 | Hildreth et al. | |
| 2009/0092001 | A1 | 4/2009 | Hildreth et al. | |
| 2017/0097295 | A1 | 4/2017 | Verkanck et al. | |

(Continued)

FOREIGN PATENT DOCUMENTS

| | | |
|---|---|---|
| KR | 10-0851776 | 8/2008 |
| WO | WO 2009/123456 A2 | 10/2009 |

OTHER PUBLICATIONS

Henderson Products, Inc., “Henderson BrineXtreme Infinity Demonstration”, uploaded to YouTube on Jul. 18, 2018, pp. 1-21, Uploaded by “Henderson Products” YouTube account, Available at https://www.youtube.com/watch?v=j1RX2x-9Fn4.

*Primary Examiner* — Kevin Joyner
(74) *Attorney, Agent, or Firm* — Hussey IP, LLC

(57) ABSTRACT

A brine maker is provided having a substantially cuboid shape. The brine maker may include: a hopper having a top opening configured to receive a solute from above the brine maker; a partition screen separating a solute side of the hopper from a brine side of the hopper; and a plurality of solvent ports located along a bottom floor of the hopper, the solvent ports configured to direct a solvent across the bottom floor of the hopper toward the partition screen.

19 Claims, 8 Drawing Sheets

(56) References Cited

U.S. PATENT DOCUMENTS

| | | | | |
|---|---|---|---|---|
| 2017/0216782 | A1* | 8/2017 | Vesterager | A47L 15/4436 |
| 2019/0329191 | A1* | 10/2019 | Hildreth | B01F 21/30 |
| 2020/0041481 | A1 | 2/2020 | Burgess | |
| 2021/0178343 | A1 | 6/2021 | Hildreth et al. | |

* cited by examiner

HIGH EFFICIENCY BRINE MAKER

This application is a non-provisional of, and claims priority under 35 USC § 119(e) to, U.S. provisional application 63/188,628, filed May 14, 2021, the entire contents of which are incorporated by reference.

TECHNICAL FIELD

This application relates to brine making and, in particular, to brine makers and/or operation thereof.

BACKGROUND

Present brine makers suffer from a variety of drawbacks, limitations, and disadvantages. Accordingly, there is a need for inventive systems and methods described herein.

BRIEF DESCRIPTION OF DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
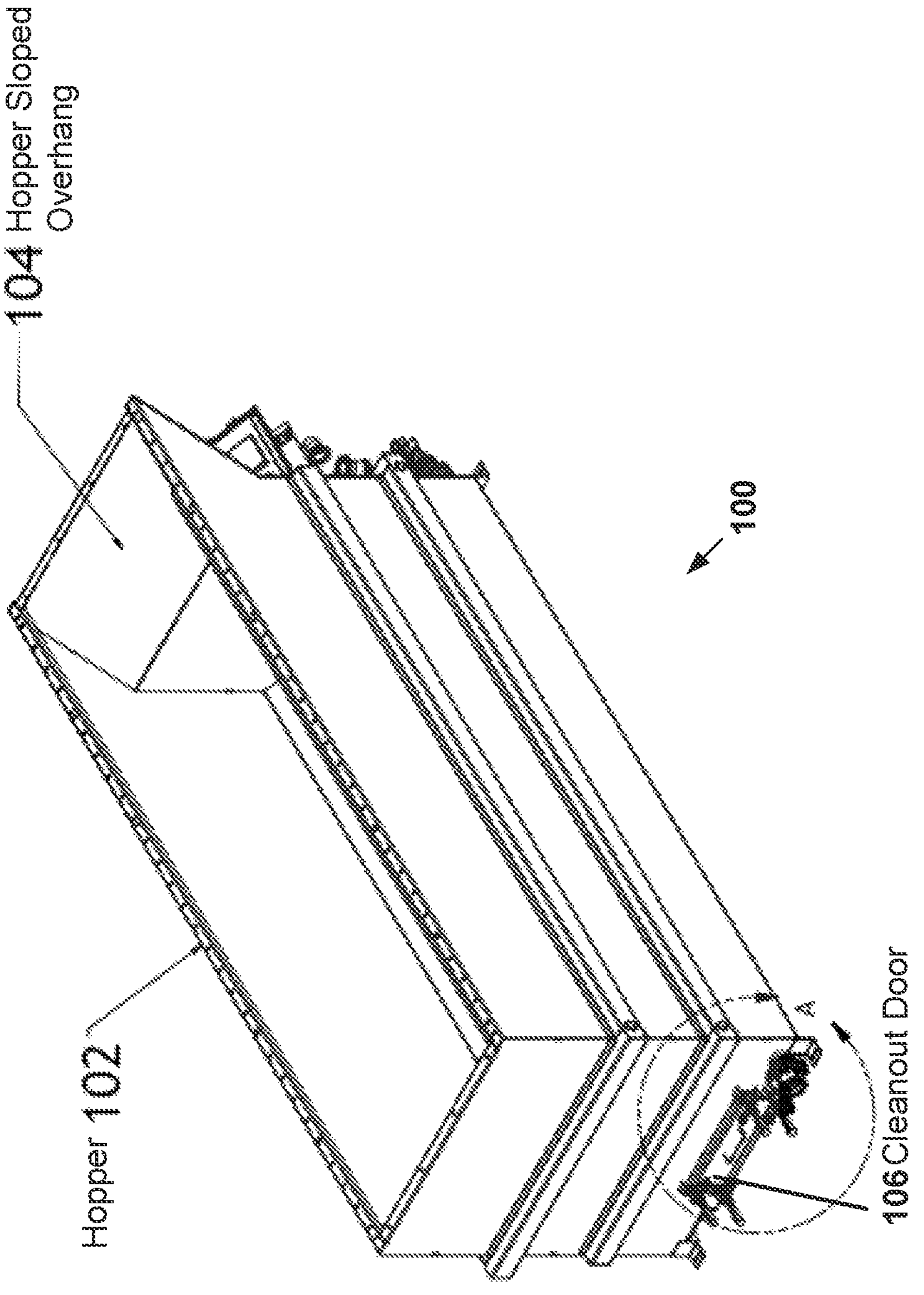
FIG. 1 is a perspective view of an example of a brine maker having a substantially cuboid shape that includes a hopper comprising a sloped overhang.

In some examples, a brine maker is provided comprising one or more of the following features:

- a hopper side-flow design where a dump inlet depth is entire depth of device. This may result in an overall shorter device that makes it easier for an operator to load the brine maker with large loader. In some examples, the dump inlet width spans the entire width of the brine maker. A result of one or both of these configurations is that the entire brine maker has a small functional footprint as it relates to the dump inlet (dump opening).
- a hopper having a floor that tapers or slopes to a narrow point for dissolving a solute such as salt. The sloping floor aids in efficiency of dissolving or eroding the solute. Such a configuration may enable the brine maker to dissolve or erode nearly an entire hopper of solute even after only small amounts of solute remain.
- a hopper that has no internal plumbing and/or pipe. The lack of plumbing such as a pipe in the salt side of the hopper aids in cleanout of the hopper because plumping and/or pipes would get in the way of tools, such as a shovel, used to sweep debris out of the hopper.
- Overflow in upper hinged portion of hopper
- Tapered width of hopper
- Side-flow design
- Removable cleanout door
- High and low floats In other examples, the brine maker may have none of the features listed above.

Device and process overview: A high efficiency brine maker is described herein. The brine maker converts rock salt into a brine solution, which in at least some examples, may have a high concentration of salt. There are various devices on the market that range from up-flow, down-flow, and side-flow brine makers. Each of the types of brine makers have merit and drawbacks. Typical bulk salt used to control roadway ice varies in gradation (salt crystal size) and in amount of waste (insoluble matter in the salt). Therefore, a brine maker that may efficiently produce a high concentration solution regardless of salt gradation and with low salt levels (solute) in the hopper by be desirable.

Production of large volumes of solution at a high concentration is generally desired in order to satisfy the needs of the users. Because the concentration of the solution is typically 23.3% or higher, having a brine maker that efficiently converts solvent, such as water, into a high concentration brine solution is desirable. Thus reducing labor and increasing productivity.

Ease of operation may be a desirable aspects of a brine maker. Alternatively or in addition, desirable aspects of the brine maker may include: ease of loading the device with bulk salt with a loader bucket, clean-out of waste such as insolvable material build up, and efficiently producing a high concentration solution regardless of solute levels.

The brine maker described herein may make high concentration solution efficiently, reduce waste, ease of cleanout and compact, provide a full size opening for loading salt, and direct salt to a narrow dissolving chamber.

Alternatively or in addition, the brine maker may facilitate easy loading of the brine maker with loader bucket, have high capacity with small foot print, efficiently dissolve solution to make a strong concentration, and/or dissolve as much solution as possible so that labor for cleanout of waste is minimized. For example, the hopper may be 5 feet wide, 10 feet wide, or any other suitable width.

FIG. 1 is a perspective view of an example of a brine maker 100 having a substantially cuboid shape that includes a hopper 102 comprising a sloped overhang 104. The perspective view in FIG. 1 shows the top of the brine maker 100, the sloped overhang 104 on the right side of the brine maker 100, a flat front side of the brine maker 100, and left side of the brine maker 100 on which a cleanout door 106 is located.

The hopper 102 has a top opening configured to receive a solute from above the brine maker 100. As explained further below, the hopper 102 also functions as a brining chamber. The hopper 102 may be constructed of stainless steel. Alternatively, the hopper 102 may be constructed of polyethylene and/or a polyethylene composite. The polyethylene hopper may be made, for example, using a rotational molding process.

Figure 2:
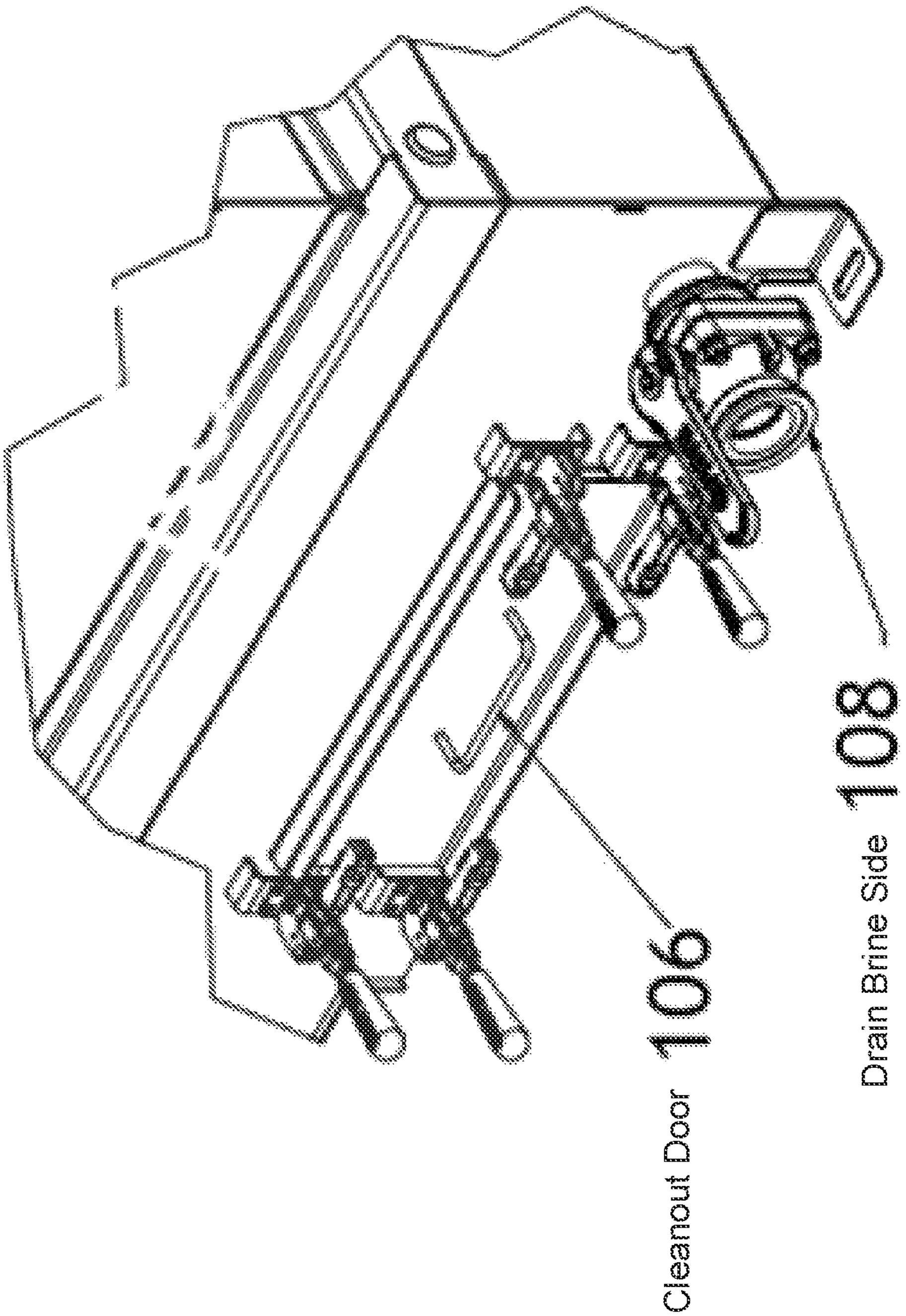
FIG. 2 is a perspective view of a lower left corner of a brine maker.

FIG. 2 is a perspective view of a lower left corner of the brine maker 100 shown in FIG. 1. In the example shown in FIG. 2, the brine maker 100 includes the cleanout door 106 and a brine side drain 108.

Figure 3:
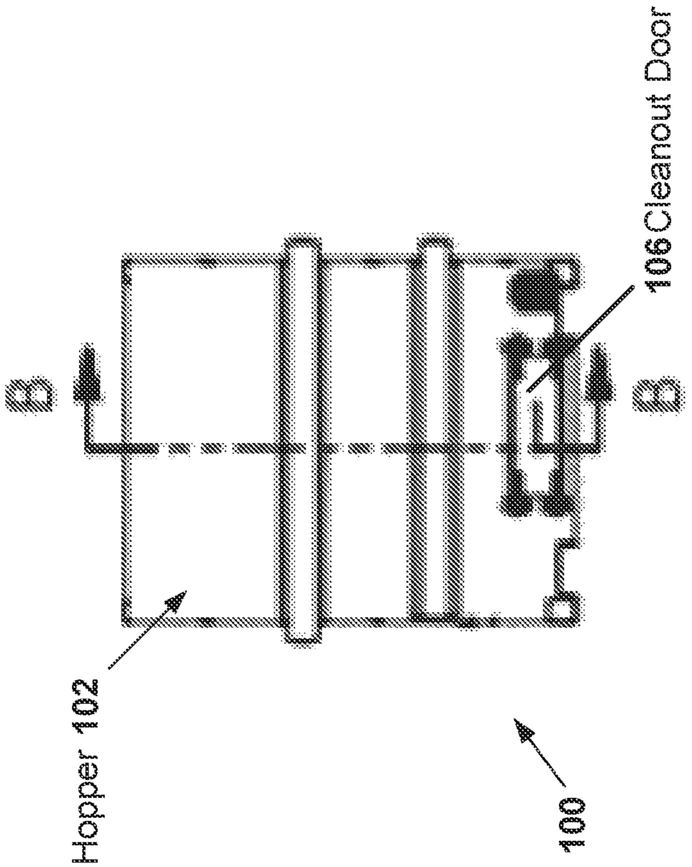
FIG. 3 is a side view of the left side of a brine maker.

FIG. 3 is a side view of the left side of the brine maker 100 shown in FIG. 1. FIG. 3 indicates where a cross-section B-B is taken through a plane parallel to the larger sides of the brine maker 100.

Figure 4:
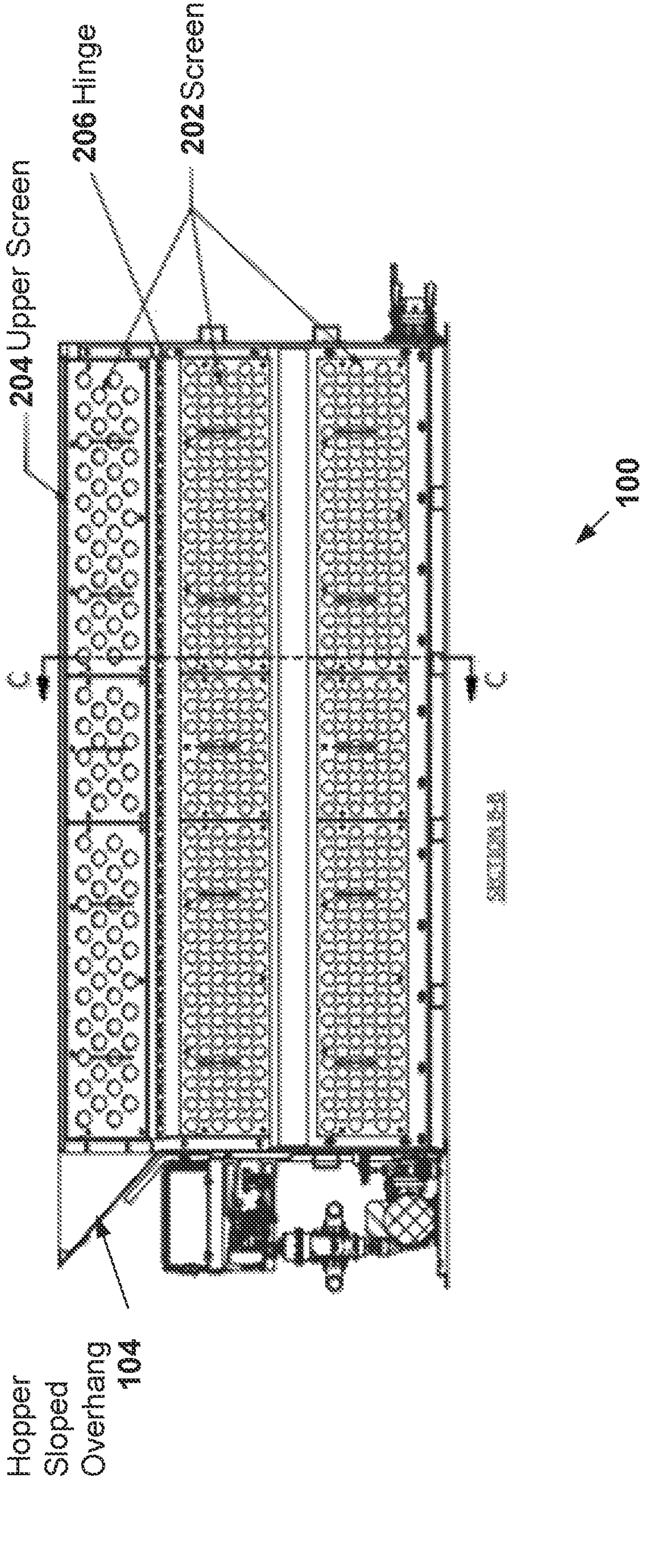
FIG. 4 is a cross-sectional view of a brine maker at the cross-section B-B facing toward the front of the brine maker.

FIG. 4 is a cross-sectional view of brine maker 100 at the cross-section B-B facing toward the front of the brine maker 100. FIG. 4 indicates where a cross-section C-C is taken through a plane that is parallel to the smaller sides of the brine maker 100.

Figure 5:
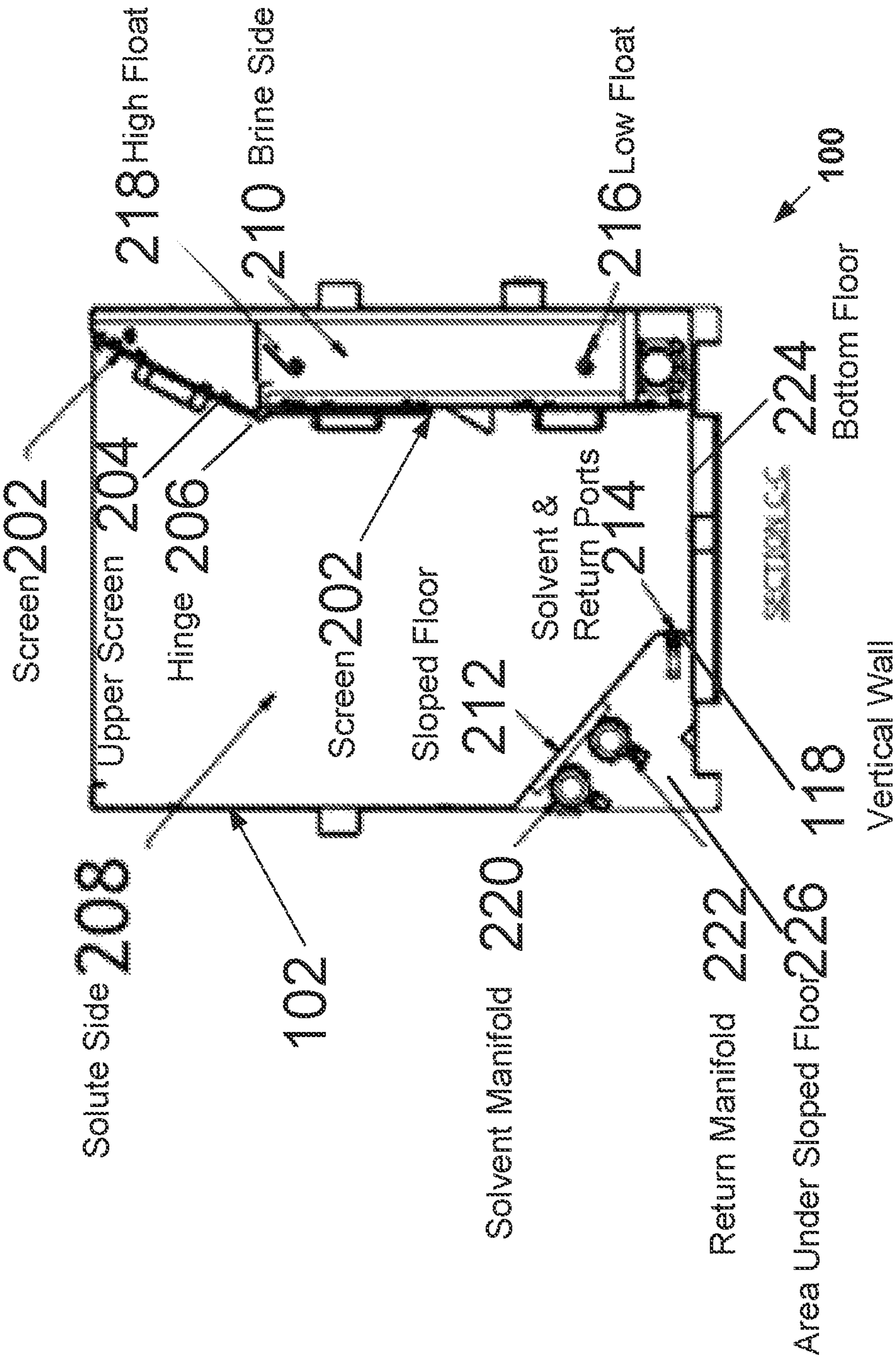
FIG. 5 is a cross-sectional view of a brine maker at the cross-section C-C.

FIG. 5 is a cross-sectional view of the brine maker 100 at the cross-section C-C.

Figure 6:
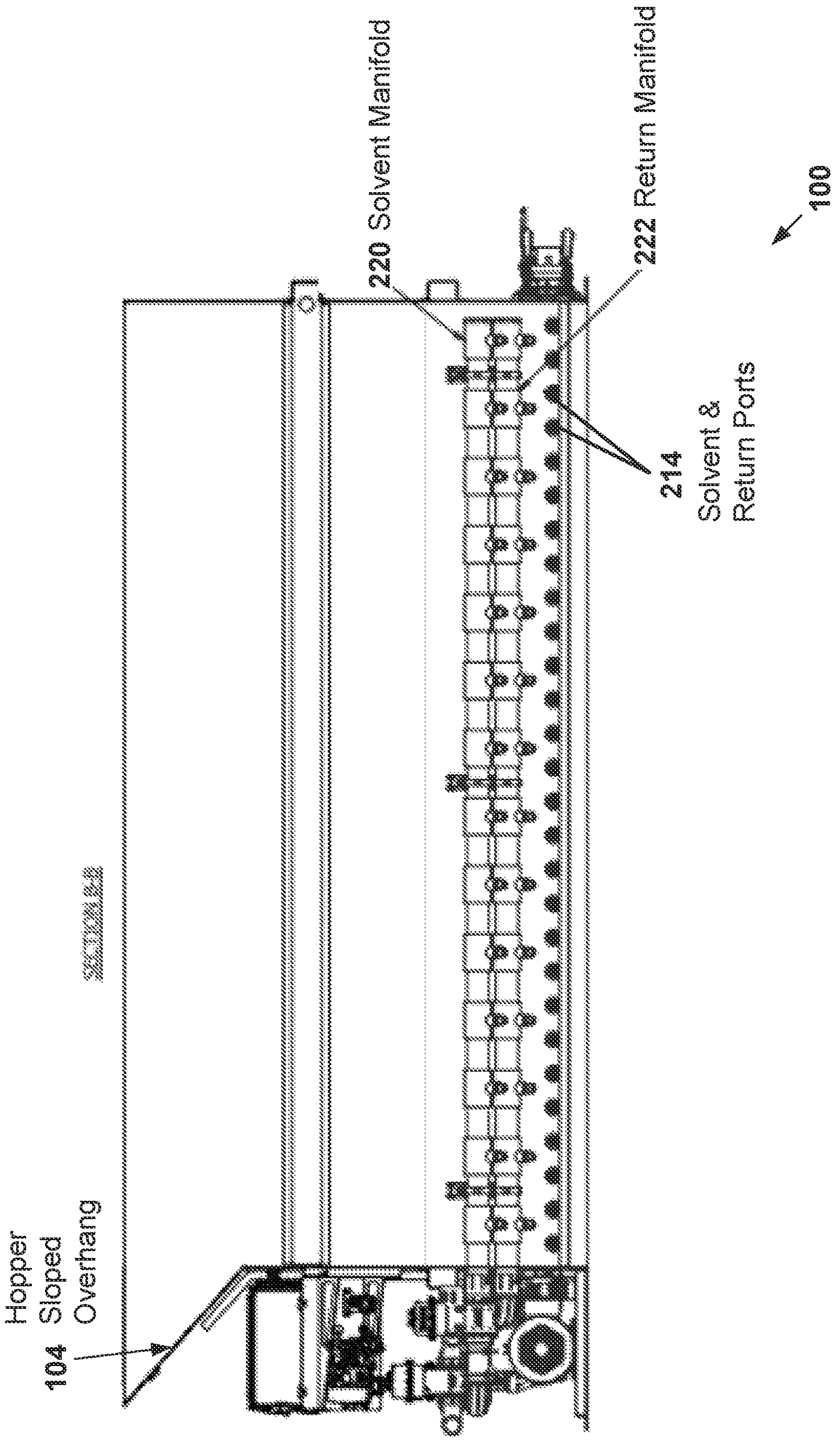
FIG. 6 is a side view of a rear side of a brine maker.

FIG. 6 is a side view of a rear side of the brine maker 100 shown in FIG. 1.

Figure 7:
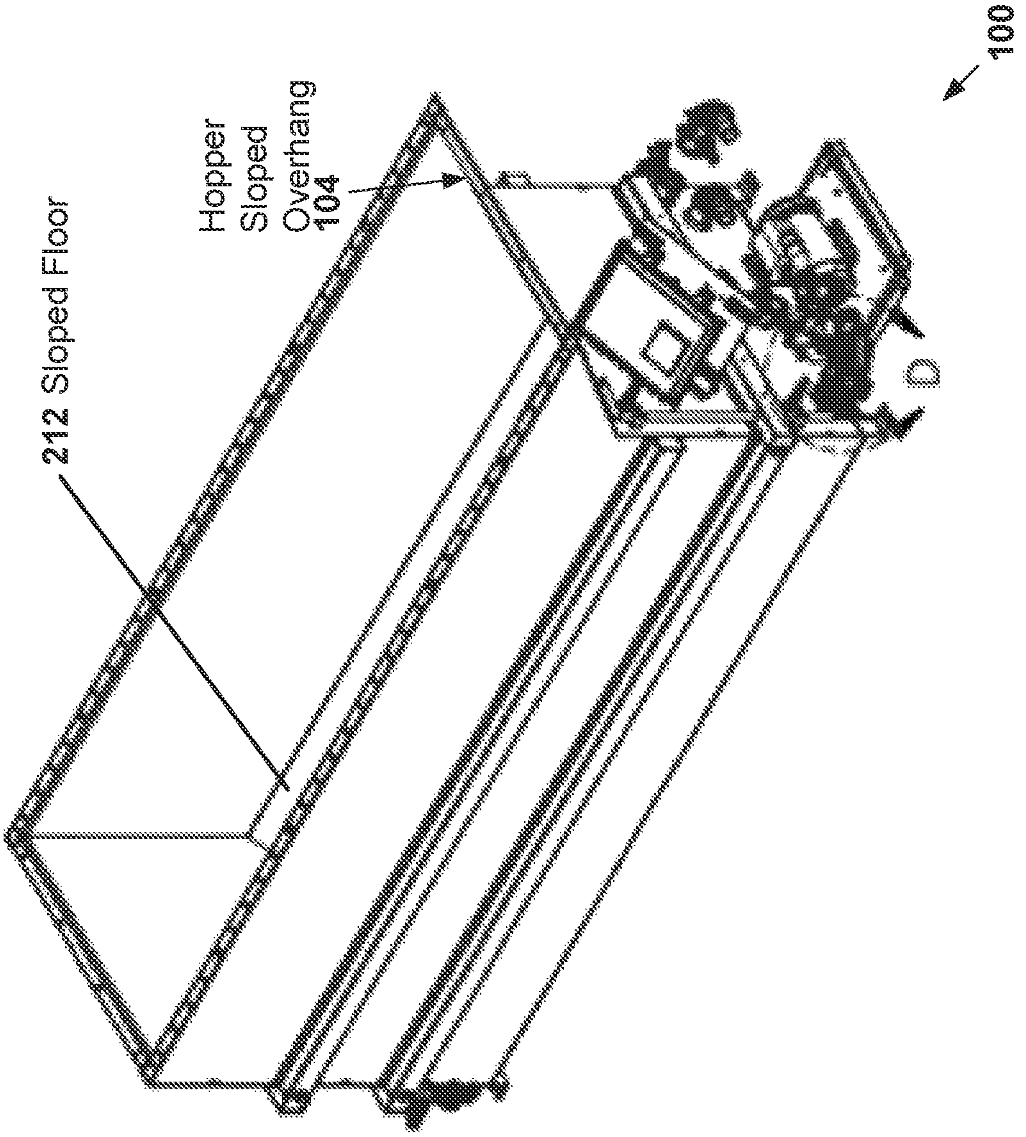
FIG. 7 is a perspective view of a brine maker showing the top of the brine maker, a sloped overhang on the right side of the brine maker, and the flat front side of the brine maker.

FIG. 7 is a perspective view of the brine maker 100 showing the top of the brine maker 100, the sloped overhang 104 on the right side of the brine maker 100, and the flat front side of the brine maker 100.

Figure 8:
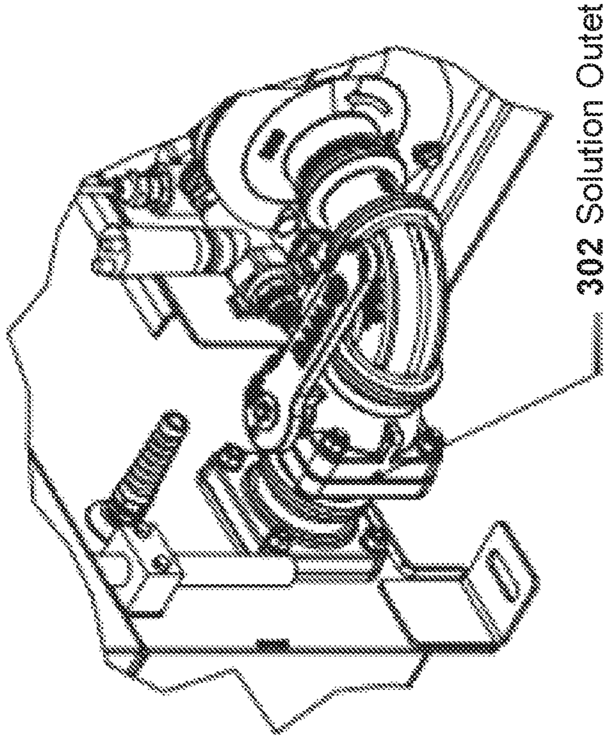
FIG. 8 is a perspective view of a lower front right corner of a brine maker

FIG. 8 is a perspective view of a lower front right corner of the brine maker 100. The lower front right corner of the brine maker 100 in the illustrated example includes a solution outlet 302 through which a brine solution may be produced.

Referring to FIGS. 4 and 5, a partition screen 202 separates a solute side 208 of the hopper 102 from a brine side 210 of the hopper 102. The partition screen 202 may extend from a bottom floor 224 of the hopper 102 to the top of the hopper as shown in the illustrated example.

The partition screen 202 may include an upper screen 204 that is slanted. The upper screen 204 may be slanted so that the upper screen 204 directs the solute, which may be dumped into the top of the hopper 102, into the solute side 208 of the hopper 102 instead of permitting the solute to fall into the brine side 210 of the hopper 102. In some examples, the upper screen 204 may be coupled to the rest of the partition screen 202 by a hinge 206. The upper screen 204 may swing open at the hinge 206 in order to provide access to the brine side 210 of the hopper 102 from the top of the hopper 102.

Referring to FIGS. 5 and 6, multiple solvent ports 214 are arranged along the bottom floor 224 of the hopper 102. For example, the solvent ports 214 may be located within 2 inches of the bottom floor 224. In other examples, the solvent ports 214 may be located within 1½ inches of the bottom floor 224.

The solvent ports 214 are configured to direct the solvent across the bottom floor 224 toward the partition screen 202. For example, the solvent ports may be configured to direct the solvent substantially parallel to the bottom floor 224 of the hopper 102.

In addition to the solvent ports 214, the brine maker 100 may include multiple return ports 214 in some examples. The return ports 214 may be arranged just above the bottom floor 224 of the hopper 102. For example, the return ports 214 may be located within 2 inches of the bottom floor 224. In other examples, the return ports 214 may be located within 1½ inches of the bottom floor 224.

The return ports 214 are configured to direct a brine solution into the solute side 208 of the hopper 102 toward the partition screen 202. The brine solution directed by the return ports 214 may be a brine solution generated by the brine maker 100 that has a concentration of salt which is out of tolerance. The concertation of salt may be out of tolerance, for example, if the brine solution has too much or too little salt relative to a target salt concentration.

As shown in the illustrated example, the return ports 214 and the solvent ports 214 may be arranged linearly along the bottom floor 224. Each one of the return ports 214 may be adjacent to a corresponding one of the solvent ports 214. In alternative examples, any other distribution of the return ports 214 among the solvent ports 214 may be implemented.

The hopper 102 may include a sloped floor 212 at the bottom of the hopper 102. The sloped floor 212 may extend the length of the back of the hopper 102. The sloped floor 212 may slope downward toward the bottom floor 224 of the hopper 102. The sloped floor 212 may extend all the way to the bottom floor 224. Alternatively, such as in the illustrated example, the hopper 102 may also include a substantially vertical wall 228 that extends from the bottom floor 224 of the hopper 102 up to a bottom edge of the sloped floor 212. The solvent ports 214 and/or the return ports 214 may be located in the substantially vertical wall 228. Alternatively or in addition, the solvent ports 214 and/or the return ports 214 may be located in the sloped floor 212.

By including plumbing outside of the hopper 102—which also functions as a brining chamber—the hopper 102 remains free of any plumbing. In other words, no pipes or other plumbing are located in the hopper 102. This makes the hopper 102 (and also effectively the brining chamber) easier to clean out.

Examples of plumbing may include pipes, hoses, manifolds, and other fixtures used to transport fluids. For example, the plumbing may include a solvent manifold 220 fluidly coupled to the solvent ports 214. As another example, if the brine maker 100 includes the return ports 214, then the plumbing may include a return manifold 222 fluidly coupled to the return ports 214. The solvent manifold 220 may include, for example, a pipe comprising fittings arranged at regular intervals along the length of the pipe, where each one of the fittings may be fluidly coupled to a corresponding one of the solvent ports 214 with a hose (not shown). The return manifold 222 may include, for example, a pipe comprising fittings arranged at regular intervals along the length of the pipe, where each one of the fittings may be fluidly coupled to a corresponding one of the return ports 214 with a hose (not shown). The plumbing, such as the solvent manifold 220 and/or the return manifold 222 may be located in the area 226 below the sloped floor 212. Alternatively, the plumbing may be located anywhere outside of the hopper 102.

During operation of the brine maker 100, the solute, typically bulk rock salt (NaCl), is loaded into the hopper 102 via a loader bucket (not shown). The loader bucket may be on a tractor, for example. The hopper 102 may be partially or fully filled with the solute. Loading the hopper 102 with the solute using a loader bucket is not precise; therefore, having a larger opening to the hopper 102 reduces overspill and enables the operator to rapidly fill the brine maker 100. The brine maker 100 having a relatively large opening and yet still having a relatively small footprint may help reduce space and increases functionality. These features may make dumping material into the hopper easier.

The upper screen 204 of the partition screen 202 is sloped downward and inward. Therefore, the upper screen 204 deflects and feeds the solute into the solute side 208 of the hopper 102. In addition, the left-to-right dump width (length of the longitudinal axis of the upper opening of the brine maker 100) is substantially the width of the brine maker 100. By having a dump opening width and depth (length of the opening in a direction perpendicular to the longitudinal axis of hopper 102 and/or the brine maker 100) that are substantially equal to the footprint of the entire brine maker 100 ensures that the dump opening for loading the brine maker 100 with bulk product via a loader bucket may be as efficient as possible.

The sloped floor 212 on the solute side 208 of the hopper 102 further funnels the solute to a narrower area at the bottom floor 224 of the hopper 102. The solvent entering the hopper 102 via the solvent ports 214 begins to dissolve the solute to form a brine solution. In some examples, the ports 214 may be located as low as possible to effectively produce a brine solution even when low amounts of solute are present and to dissolve as much solute as possible without waste.

As mentioned further above, the partition screen 202 separates the hopper 102 into 2 portions: the solute side 208 with "Rock Salt" and the solution side 210 comprising NaCl Brine solution. The solvent enters the hopper 102 through the solvent ports 214 that use conduit (not shown) connected to the solvent manifold 220. A flow of the solvent through the solvent ports 214 substantially erode the solute to form the brine solution. The brine solution passes through the partition screen 202 into a chamber of the hopper (the brine side 210) where the brine solution gathers. Liquid level sensors, a low float 216 and a high float 218 sense lower and upper liquid levels respectively. The level sensors 216 and 218 may be in communication with a pump or other control device(s) that control the flow of liquid into and/or out of the brine maker 100. The level sensors 216 and 218 may provide an indication if the brine solution is sufficiently high enough (above the low float 216) to pump or if the solution level is high enough (above the high float 218) to stop the flow of solvent into the hopper 102.

The side-flow design together with the partition screen 202 may be an advantage of the hopper. In the illustrated example, liquid level sensors 216 and 218 are in communication with solvent inlet controls, manual or automated, to ensure the liquid in the hopper 102 is substantially kept from filling the hopper 102 entirely. The low float 216 helps when adding more solute into the hopper 102 because the liquid in the hopper 102 may be displaced when adding the solute. The liquid in the hopper 102 may be kept at a lower level around the level of the low float 216. Keeping the liquid at the lower level may reduce spillage of the brine solution outside of the hopper 102.

The partition screen 202, which may run the entire vertical height of the hopper 102, allows the brine solution to pass from the solute side 208 of the hopper 102 to the brine side 210 of the hopper 102 regardless of waste buildup in the hopper. The waste buildup may plug the partition screen 202 at various locations with debris. Thus, as insoluble material builds up at the bottom of the hopper 102 on the solute side 208, a portion of the partition screen 202 may become plugged; however, a substantial portion of the partition screen 202 will remain free of insoluble waste so as to maintain a free flow of brine solution from the solute side 208 to the brine side 210.

The brine side 210 of the hopper 102 houses the liquid level sensors 218 and 216 where the solute will not interfere with the operation of the liquid level sensors. The brine side 210 acts as a holding vessel where the velocity of the brine solution is reduced to enable fine unsolvable matter that is in suspension to fall out of suspension prior to the brine solution exiting the brine side 210 of the hopper 102 through the solution outlet 302.

The upper screen 204 may swing open at the hinge 206 in order to provide access to the brine side 210 of the hopper 102 for cleaning and service while allowing solution to pass through the rest of the partition screen 202, thus maximizing, or at least improving, the loading of the solute through the top of the hopper 102.

Undissolved solute may be cleaned out from hopper 102. For cleanout of insoluble material in the solute side 208 of the hopper 102, it may be desirable to first dissolve as much solute as possible and leave remaining insoluble waste materials behind. For ease of cleanout, it may be desirable to have the bottom floor 224 and the hopper 102 free of plumbing, such as pipes and/or other components, because the plumbing may otherwise obstruct removal of debris buildup. For example, this area being free of plumbing enables the removal of waste material by pushing the waste out through the cleanout door 106. Thus, the hopper 102 is free of piping and/or other obstructions to allow for easy and quick cleanout. The brine maker 100 is designed to dissolve the solute at the lowest point in solute side 208 of the hopper 102 with no internal pipe or obstructions.

In a first aspect, a brine maker may be provided that includes the sloped floor 212 in hopper 102 to narrow the portion of the hopper 102 that also functions as dissolving chamber and to funnel the solute to the solvent ports 214.

In a second aspect, ports 214 are located below the sloped floor 212 and at a relatively low point on the substantially vertical wall 228. The ports 214 may run substantially the width of the hopper 102, at the bottom of the hopper 102, and on the side of the hopper 102 having the sloped floor 212.

In a third aspect, the partition screen 202 may be sloped starting at top of the brine maker 100 to permit a full depth top opening for salt dump and for maximizing opening size.

In a fourth aspect, no internal piping or other plumbing is located inside of the hopper 102 to ease cleanout and maintenance.

Other aspects may include any of the following or combinations thereof:

The cleanout door 106;

Side-flow design; and/or

A drain on the solution side.

The brine maker 100 may be implemented with additional, different, or fewer components than shown or described herein. For example, the brine maker 100 may include a processor in communication with a memory, one or more control valves, and/or pump(s). Examples of the processor may include a general processor, a central processing unit, a controller, a microcontroller, a computer, an application specific integrated circuit (ASIC), a digital signal processor, a field programmable gate array (FPGA), and/or a digital circuit, analog circuit. Each component may include additional, different, or fewer components.

All of the discussion, regardless of the particular implementation described, is exemplary in nature, rather than limiting. For example, the hopper 102 in the example shown in FIG. 1 has the sloped overhang 104 on the right side of the brine maker 100. Alternatively or in addition, the hopper 102 may have the sloped overhang 104 on the left side of the brine maker 100. In still other examples, the hopper 102 may not include any sloped overhang and the front, back, left, and right sides of the brine maker 100 extend vertically the entire length of the respective side of the brine maker 100.

In the illustrated examples, the solution outlet 302 is on the right side whereas the cleanout door 106 and the brine side drain 108 are on the left side. However, in other examples, these components may be in different locations.

In the illustrated examples, an upper portion of the partition screen 202 is an upper screen 204. In alternative examples, the upper portion of the partition screen 202 includes no screen.

The directional terms such as "top", "bottom", "downward" refer to directions when the brine maker 100 is oriented so as to be operational. The term "substantially" means approximately (within a tolerance of 5 percent).

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

REFERENCE CHARACTERS

| Callout | Item |
|---|---|
| 100 | Brine Maker |
| 102 | Hopper |
| 104 | Hopper Sloped Overhang |
| 106 | Cleanout door |
| 108 | Drain brine side |
| 202 | Partition Screen |
| 204 | Upper Screen for Overflow |
| 206 | Hinge in Partition Wall |
| 208 | Solute Side of hopper |
| 210 | Brine Side of Hopper |
| 212 | Sloped Floor |
| 214 | Solvent & Return Ports |
| 216 | Low Float |
| 218 | High Float |
| 220 | Solvent Manifold |
| 222 | Return Manifold |
| 224 | Bottom Floor |
| 226 | Area Below Sloped Floor |
| 228 | Substantially Vertical Wall |
| 302 | Solution Outlet |

What is claimed is:

1. A brine maker having a substantially cuboid shape, the brine maker comprising:

a hopper having a top opening configured to receive a solute from above the brine maker;

a partition screen separating a solute side of the hopper from a brine side of the hopper;

a plurality of solvent ports located along a bottom floor of the hopper, the solvent ports configured to direct a solvent from the solvent ports across the bottom floor of the hopper toward the partition screen;

a sloped floor; and a substantially vertical wall, the sloped floor arranged to direct the solute to the bottom floor of the hopper, the substantially vertical wall extending from a bottom edge of the sloped floor to the bottom floor of the hopper, wherein the solvent ports are located in the substantially vertical wall.

2. The brine maker of claim 1, wherein the solvent ports are located within 1½ inches of the bottom floor of the hopper.

3. The brine maker of claim 1, wherein the solvent ports are configured to direct the solvent substantially parallel to the bottom floor of the hopper.

4. The brine maker of claim 1 further comprising a plurality of return ports configured to direct a brine solution into the solute side of the hopper.

5. The brine maker of claim 4, wherein the return ports are located within 1½ inches of the bottom floor of the hopper.

6. The brine maker of claim 4, wherein the return ports and the solvent ports are arranged linearly.

7. The brine maker of claim 1, wherein the hopper includes a sloped floor arranged to direct the solute to the bottom floor of the hopper.

8. The brine maker of claim 1, wherein no pipes or other plumbing are located in the hopper.

9. The brine maker of claim 8 further comprising a solvent manifold fluidly coupled to the solvent ports and a return manifold fluidly coupled to a plurality of return ports, the return ports located adjacent to the solvent ports, wherein the solvent manifold is located outside of the hopper.

10. The brine maker of claim 1, wherein the partition screen, which separates the solute side of the hopper from the brine side of the hopper, extends from the bottom floor of the hopper to the top of the hopper, and wherein the partition screen includes an upper portion that is slanted so that the upper portion is configured to direct the solute into the solute side of the hopper.

11. The brine maker of claim 10 wherein the upper portion includes a slanted screen.

12. A brine maker having a substantially cuboid shape, the brine maker comprising:

a hopper having a top opening configured to receive a solute from above the brine maker;

a partition screen separating a solute side of the hopper from a brine side of the hopper; and a plurality of solvent ports configured to direct a solvent from the solvent ports across a bottom floor of the hopper toward the partition screen, wherein the hopper includes a sloped floor configured to direct the solute to the bottom floor of the hopper, wherein a wall extends from the bottom floor of the hopper up to a bottom edge of the sloped floor, and wherein the solvent ports are located in the wall.

13. The brine maker of claim 12 further comprising a solvent manifold fluidly coupled to the solvent ports, the solvent manifold located outside of hopper.

14. The brine maker of claim 12, wherein the wall is a substantially vertical wall.

15. The brine maker of claim 14 further comprising a plurality of return ports configured to direct a brine solution into the solute side of the hopper, the return ports located in the substantially vertical wall.

16. The brine maker of claim 15 further comprising a solvent manifold fluidly coupled to the solvent ports and a return manifold fluidly coupled to a plurality of return ports, the return ports located in the substantially vertical wall, the solvent manifold and the return manifold located outside of the hopper under the sloped floor.

17. A brine maker having a substantially cuboid shape, the brine maker comprising:

a hopper having a top opening configured to receive a solute from above the brine maker, the hopper including a sloped floor, a bottom floor, and a wall extending from a bottom edge of the sloped floor down to the bottom floor;

a partition screen separating a solute side of the hopper from a brine side of the hopper; and a plurality of solvent ports located in the wall and configured to direct a solvent from the solvent ports across the bottom floor of the hopper toward the partition screen, wherein the partition screen extends from the bottom floor of the hopper to the top of the hopper, wherein the partition screen includes an upper portion that is slanted so that the upper portion is configured to direct the solute into the solute side of the hopper.

18. The brine maker of claim 17, wherein the upper portion includes a slanted screen.

19. The brine maker of claim 17, wherein the upper portion is hinged and swings open to provide access to the brine side of the hopper from the top of the hopper.

* * * * *